United States Patent
Hsu

(10) Patent No.: US 9,215,577 B2
(45) Date of Patent: Dec. 15, 2015

(54) WEARABLE HEALTHCARE DEVICE

(71) Applicant: GUIDER TECHNOLOGY CO., LTD., Taipei (TW)

(72) Inventor: Pin-Hsiang Hsu, Taipei (TW)

( * ) Notice: Subject to any disclaimer, the term of this patent is extended or adjusted under 35 U.S.C. 154(b) by 86 days.

(21) Appl. No.: 13/644,137

(22) Filed: Oct. 3, 2012

(65) Prior Publication Data
US 2013/0324072 A1 Dec. 5, 2013

(30) Foreign Application Priority Data
Jun. 5, 2012 (TW) .............................. 101210825 U

(51) Int. Cl.
*H04W 4/22* (2009.01)
*H04W 4/00* (2009.01)

(52) U.S. Cl.
CPC ................ *H04W 4/22* (2013.01); *H04W 4/003* (2013.01); *H04W 4/006* (2013.01)

(58) Field of Classification Search
CPC ..... H04W 4/22; H04W 76/007; H04W 4/003; H04W 4/006
USPC ......................... 455/404.2, 456.1–457, 404.1
See application file for complete search history.

(56) References Cited

U.S. PATENT DOCUMENTS

| | | | |
|---|---|---|---|
| 7,221,928 B2* | 5/2007 | Laird et al. | 455/404.1 |
| 7,787,857 B2* | 8/2010 | Peterman | 455/404.1 |
| 2006/0025282 A1* | 2/2006 | Redmann | 482/8 |

* cited by examiner

*Primary Examiner* — Marcos Torres

(57) ABSTRACT

A wearable healthcare device includes a wearable support for a care receiver. The support is provided with an operation means, sensing means, a positioning means, a Bluetooth communication means, a help calling means, a wireless communication means, a wireless transmission means, and a information processing means. The information processing means generates a healthcare information to the medical person who uses the remote server according to the information from the above means. And the information processing means receives the healthcare information, which is from the remote server that analyzes the previously sent information, for reminding the care receiver properly.

5 Claims, 3 Drawing Sheets

WEARABLE HEALTHCARE DEVICE

FIELD OF THE INVENTION

The present invention relates to a sensing device for healthcare, and more particularly to a wearable healthcare device.

BACKGROUND OF THE INVENTION

Due to the change of lifestyle and the improvement of medical technology, diseases which are deemed difficult to be treated in the past such as acute disease and severe disease gradually become as treatable as chronic disease through long term care. As a result, people pay more attention to the importance of medical care.

The chronic disease, such as cardiovascular disease, diabetes, malignant tumor, asthma, and mental illness, requires long term treatment in consideration of its complexity and chronic hurt to the health. The requirement needed to be notified for the long-term healthcare treatment is very complicate, so the difficulty of healthcare treatment hence becomes.

For example, patients in chronic diseases usually need long-term mediation. And the patients must accurately follow the medication time if an effective treatment is desired. Other important matters such as revisiting hospital consultation or rehabilitation on schedule are things easily to be forgotten by patients.

However, because of busy modern lifestyle and small population for a general household, which means less time that family members stay at home, it thus causes that the family is incapable to care the patient at home and the problems mentioned above is hard to be noticed.

SUMMARY OF THE INVENTION

In view of the reasons mentioned above, an individual household can't be trusted as a convenient source of healthcare due to the reasons above. Nevertheless, it is also difficult for patients to request themselves to do well in taking medicine, hospital revisiting, and rehabilitation.

Accordingly, the present invention provides a wearable healthcare device to overcome the drawbacks of the prior art.

The wearable healthcare device comprises a support, an operation means, a sensing means, a positioning means, a Bluetooth communication means, a help calling means, a wireless communication means, a wireless transmission means, and an information processing means. The support has a wearing component wearable for a care receiver. The operation means is provided on the support, functioning as an operation interface to generate an operation information. The sensing means, provided on the support, includes a physiology sensing unit and an environment sensing unit to obtain at least one sensing information. The positioning means, provided on the support, for obtaining a position information of the support. The Bluetooth communication means, provided on the support, is connected to a healthcare measurement apparatus in wireless manner to obtain at least one measurement data from the healthcare measurement apparatus. The help calling means, provided on the support, for generating a help calling information by triggering. The wireless communication means, provided on the support, is wirelessly communicated to a communication device. The wireless transmission means, provided on the support, is wirelessly transmitted to a remote server by means of a wireless transport service. The information processing means provided on the support, is connected with the operation means, the positioning means, the Bluetooth communication means, the wireless communication means and the wireless transmission means. And the healthcare information is generated according to one or more information selected form the group including the operation information, the sensing information, the position information, the measurement data, and the help calling information. The healthcare information is generated by the information processing means or by the remote server based on the information transmitted from the information processing means to the remote server via the wireless transmission means, and the information processing means receives the healthcare information generated by the remote server via the wireless transmission means.

In a preferred embodiment of the present invention, the physiology sensing unit includes a body surface temperature sensor.

In a preferred embodiment of the present invention, the environment sensing unit includes one or more sensors from the group including an altitude sensor, a gravity sensor, a displacement sensor, and a barometric pressure sensor.

In a preferred embodiment of the present invention, the positioning means includes one or two units selected from the group of a GPS positioning unit and base station positioning unit.

In a preferred embodiment of the present invention, the wireless communication means includes a sound receiving unit and a speaker unit.

In a preferred embodiment of the present invention, it further comprises a warning means, provided on the support, being connected to the information processing means.

By means of technical means of this present invention, the wearable healthcare device can be used to do measure the physiological information by itself or collaborating with external measurement apparatus and can obtain other information of the care receiver such as the environment information and the motion measurement information, so that the situation of the care receiver can be observed completely. In addition, as the abnormal situation or the unexpected situation happened, the care receiver can ask for help by the wearable healthcare device actively, and it can be determined and rescued via the wearable healthcare device or remote server passively. As the result, by wearing the wearable healthcare device, the care receiver can receive the care all the time, and the load of the medical person, the family, and the care receiver itself can be mitigated.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
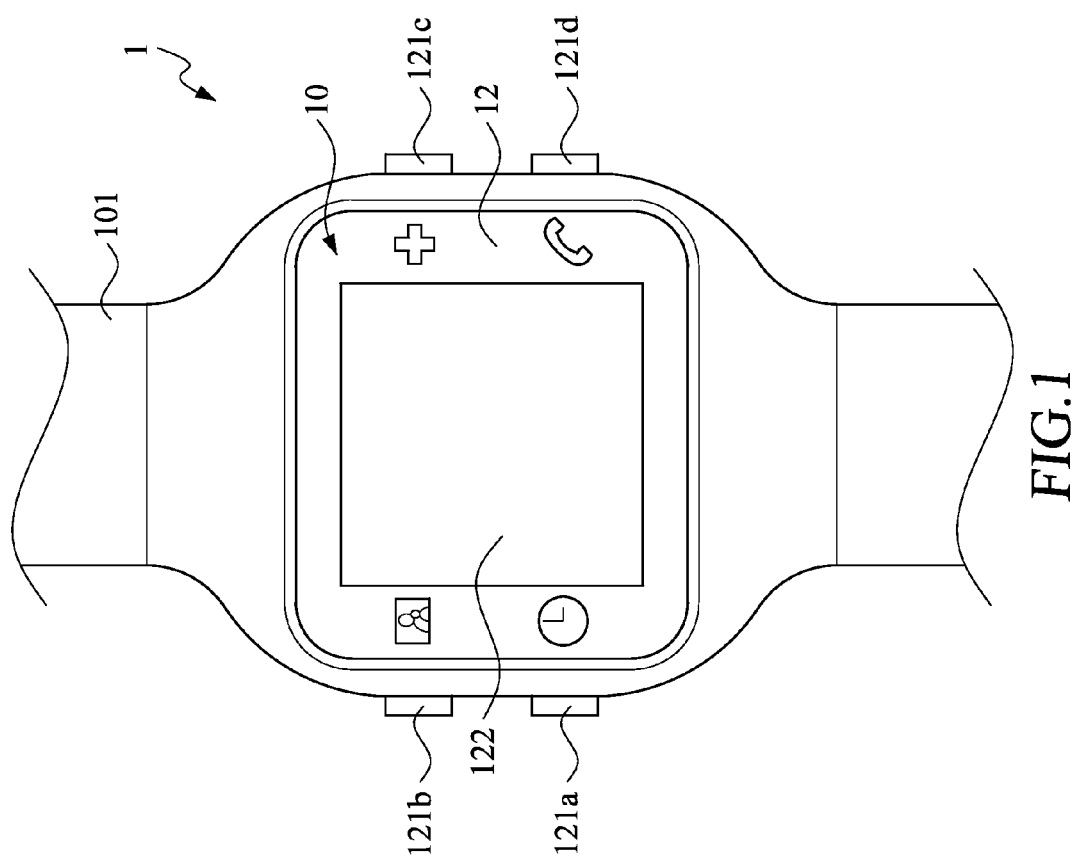
FIG. 1 is a stereogram illustrating the wearable healthcare device of the embodiment according to the present invention.
Figure 2:
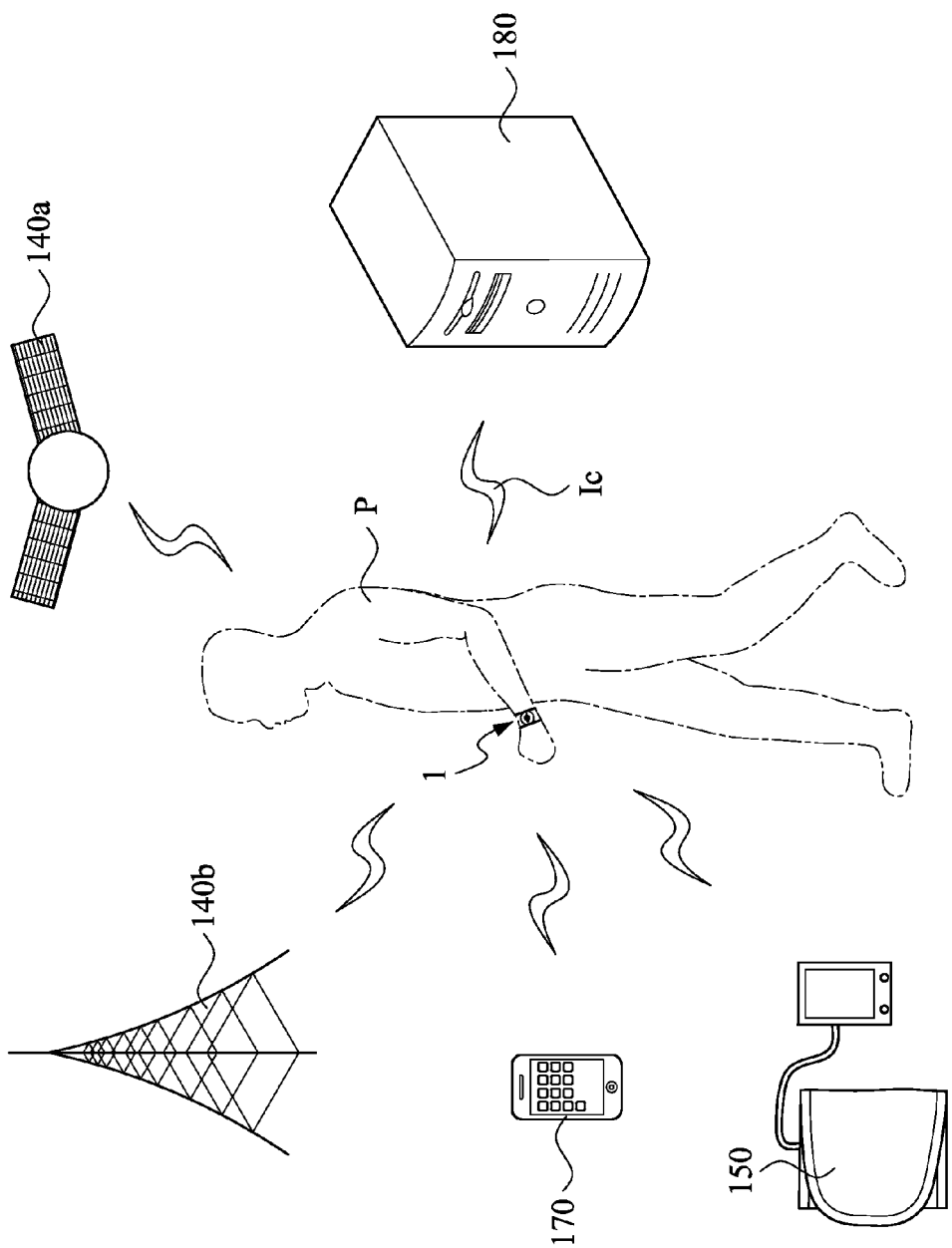
FIG. 2 is a schematic illustrating the application environment of the wearable healthcare device of the embodiment according to the present invention.
Figure 3:
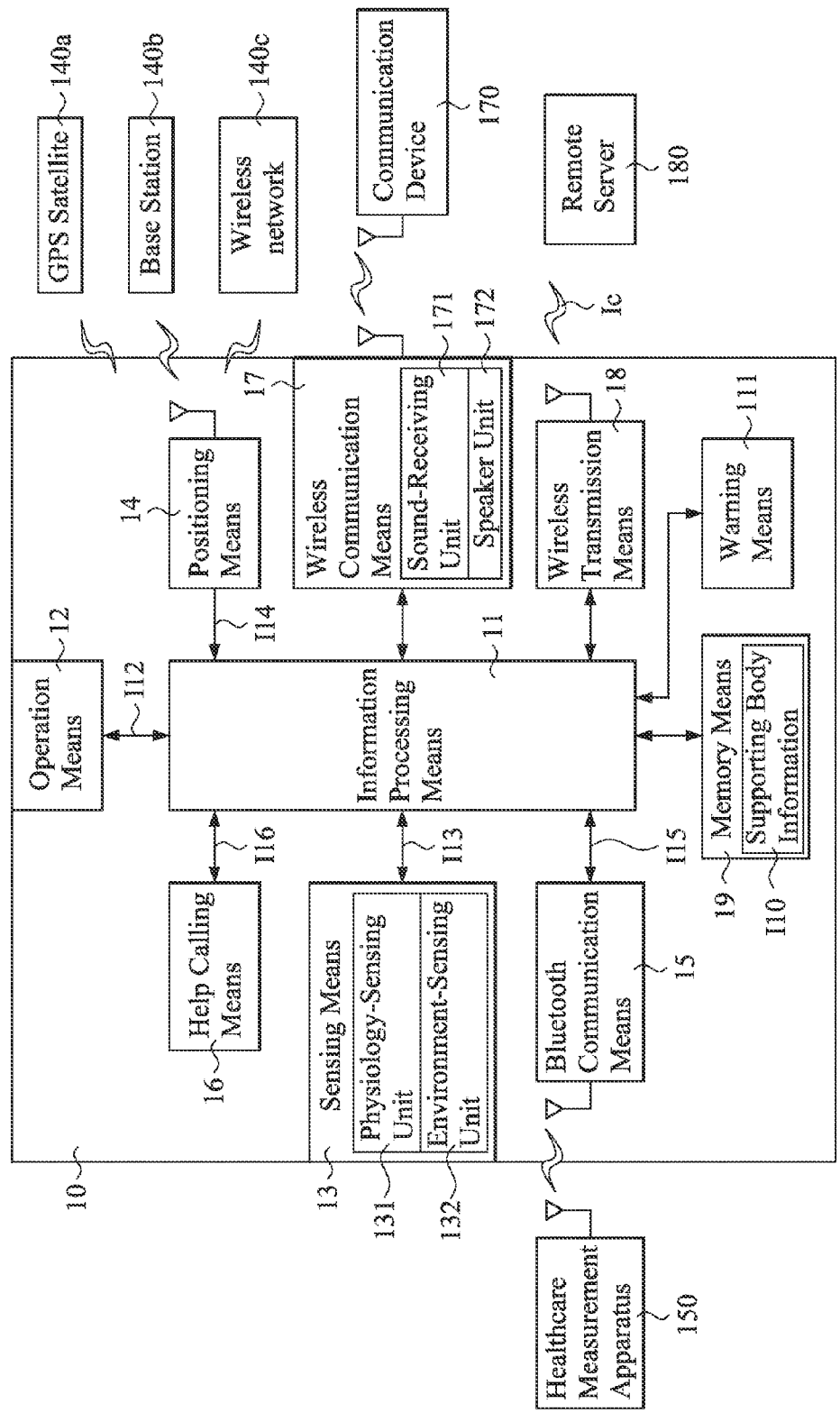
FIG. 3 is a block diagram illustrating the wearable healthcare device of the embodiment according to the present invention.

A wearable healthcare device 1 of the present invention is shown in FIG. 1 to FIG. 3. FIG. 1 is a stereogram illustrating the wearable healthcare device according to an embodiment of the present invention. FIG. 2 is a schematic illustrating the application environment of the wearable healthcare device according to the embodiment of the present invention. FIG. 3 is a block diagram illustrating the wearable healthcare device according to the embodiment of the present invention.

Please refer to the FIG. 1 and FIG. 2. In this embodiment, the wearable healthcare device 1 includes a support 10. The support 10 has a wearing component for a care receiver P wearing. Preferably, the support 10 is a watch, which can be put on the wrist of the care receiver P, so that the care receiver P can wear the watch all the time without holding it or putting it in the pocket of clothes.

Refer to the FIG. 3. In this embodiment, the support 10 is provided with an information processing means 11, an operation means 12, a sensing means 13, a positioning means 14, a Bluetooth communication means 15, a help calling means 16, a wireless communication means 17, a wireless transmission means 18, and a memory means 19.

The information processing means 11, which is in charge of the total electric circuit operations of the wearable healthcare device 1, is connected with the operation means 12, the sensing means 13, the positioning means 14, the Bluetooth communication means 15, the help calling means 16, the wireless communication means 17, the wireless transmission means 18, and the memory means 19. The information processing means 11 may include an analog-to-digital converter unit, a computing/logical unit, a control/coordination unit, and so on, to process, to compute, and to determine input/output signals.

The operation means 12, which is used as an operation interface, includes a plurality of operation keys 121a, 121b, 121c, and 121d and a touch panel 122 in this embodiment. An operation information I12 can be generated by pressing the operation keys 121a, 121b, 121c, 121d or by touching the touch panel 122, and then the operation information I12 is received by the information processing means 11 to execute the corresponding operations. For example, the present time is displayed while the operation key 121a is pressed, and the sensing means 13/Bluetooth communication means 15, the help calling means 16, and the wireless communication means 17 are activated while the corresponding operation key 121b, 121c, and 121d is pressed respectively.

The sensing means 13 includes a physiology sensing unit 131 and an environment sensing unit 132. The physiology sensing unit 131 is used to sense a physiology information of the care receiver P. For example, the physiology sensing unit 131 may include a body temperature sensor for sensing the temperature of the care receiver P. In addition, this sensed temperature can be further used to determine whether the care receiver P wears the wearable healthcare device or not. However, the present invention is not limit to this. The physiology sensing unit 131 may further include another sensor, such as a blood glucose sensor, a blood pressure sensor, a blood oxygen sensor, an electromyography sensor, etc. The environment sensing unit 132 is used to sense an environment information about surrounding environment of the care receiver P. For example, the environment sensing unit 132 may include an altitude sensor, a gravity sensor, a displacement sensor, a barometric pressure sensor, and the like, for sensing altitude information, the motion measurement information, the displacement measurement information, the atmospheric pressure of the environment, etc. Taking the gravity sensor as example, the movement acceleration of the support 10, which is sensed by the gravity sensor, can be considered as one of the determining criteria of falling down. However, the present invention is not limited to this. The environment sensing unit 132 may further include another sensor. The sensing information I13 (physiology information and/or environment information) generated by the sensing means 13 is received by the information processing means 11.

Positioning means 14 is used to obtain a position information I14 of the support 10, that is, the position of the care receiver P. The positioning means 14 includes a GPS (Global Positioning System) unit and/or a base station unit and/or Wireless network. The GPS unit uses the GPS satellite 140a to position the care receiver P on the earth surface. The base station positioning uses the base station 140b of the mobile communication network for positioning. In general, the GPS positioning is usually used for outdoor positioning, and base station positioning is used to assist the GPS positioning in indoor positioning, so that the requirement of positioning in outdoor and indoor can be satisfied. The positioning information I14, generated by the positioning means 14, is received by the information processing means 11.

The Bluetooth communication means 15 can be wirelessly connected to a healthcare measurement apparatus 150 by Bluetooth. The healthcare measurement apparatus 150 may be a sphygmomanometer, a glucosemeter, a weight meter, a spirometer, an oximeter, a capnometer, or the like. Some measurement apparatus have large size or have many accessories, so that it can't be provided on the support 10. By searching, matching, and creating a connection to the external healthcare measurement apparatus via Bluetooth communication means 15, the measurement data 115 thus can be obtained from the healthcare measurement apparatus and be received by the information processing means 11.

The help calling means 16 may generate a help calling information I16 by triggering. The help calling information I16, generated by the help calling means 16, is received by the information processing means 11, so that the follow-up help calling procedure can be executed. In this embodiment, help calling means 16 can be triggered by pressing the operation key 121c. Furthermore, in a preferred embodiment, the other operation key can be set as the cancel key to the help calling means 16 for canceling the help calling procedure if it is needless to keep on calling help or the help calling means 16 is touched due to carelessness. Besides, the on/off status of the help calling means 16 may be selected alternatively according to the times of pressing the same key or the time period of pressing the same key.

In this embodiment, the wireless transmission means 17 is a GSM means and it can be wireless communicated to a communication device 170 (e.g., a cell phone) via the GSM (Global System for Mobile Communications). The embodiment is not used to limit the present invention. The wireless communication means 17 may be wirelessly communicated via 3G or CDMA or 4G (LTE or WiMAX) or other wireless network. In this embodiment, the wireless communication means 17 includes a sound receiving unit 171 and a speaker unit 172. After pressing the operation key 121d, the wireless communication means 17 creates a connection to the communication device 170 of default object, so that the care receiver P can contact the family and doctor in time by the sound receiving unit 171 and the speaker unit 172.

The wireless transmission means 18 is wirelessly transmitted to a remote server 180 via wireless transport service. Speaking in detail, the wireless transmission means 18 is connected to the network via wireless transmission network, and creates a connection with the remote server 180 for uploading information to the remote server 180 or downloading information from the remote server 180.

The memory means 19 is used to store information, such as the support information I10 of the support 10. The support information I10 may include the identification information of the care receiver P for identifying the care receiver P.

The information processing means 11 is used to receive the information from the means as mentioned previously, and generate a healthcare information Ic base on one or more information selected form the group including the operation I12 information, the sensing information I13, the position information I14, the measurement data I15 and the help calling information I16.

Speaking in detail, the healthcare information Ic, which is generated by the information processing means 11 itself, may be a composite of a plurality of information. For example, the healthcare information Ic may be the composite information including sensing information I13, position information I14, and/or measurement data I15, and the healthcare information Ic is sent to the remote server 180 at predetermined time via the wireless transmission means 18. As the result, the medical person can adjust the medication from the remote server 180 at any time according to the physiological condition (by the physiology information and the measurement data I15), the motion measurement information (by the sensing information I13) and the surrounding environment (by the environment information) of the care receiver P.

Alternatively, the healthcare information Ic may be a judgment, which is generated after analyzing a plurality of information. The information processing means 11 is used to send the information to the remote server 180 via the wireless transmission means 18. According to the physiological condition of the care receiver P, the medical person can adjust the medication of the care receiver P or give advice for the improperly action of the care receiver P. Accordingly, the remote server 180 generates the healthcare information Ic, and the healthcare information Ic is received by the information processing 11 via the wireless communication means 18. Therefore, the warning means 111, which is connected with the information processing means 11, can be used to remind the care receiver P and report the healthcare information Ic to the care receiver P. The warning means 111 may be a buzzer, speaker, or lights, to remind the care receiver P by the sound or lighting. In this embodiment, the touch panel 122 may also be used as a monitor for displaying the healthcare information Ic.

By the structures mentioned above, the wearable healthcare device 1 can be used to do the physiological measurement with the sensors itself and the external measurement apparatus, so that the situation of the care receiver P can be got completely with other information of care receiver P such as the surrounding environment, the motion measurement information, etc. In addition, as the abnormal situation or the unexpected situation happened, the care receiver P can ask for help by the wearable healthcare device 1 actively, and it can be determined and rescued via the wearable healthcare device or remote server 180 passively. As the result, by wearing the wearable healthcare device, the care receiver P can receive the care, and the load of the medical person, the family, and the care receiver P itself can be mitigated.

As can be appreciated from the above embodiments, the wearable healthcare device of the present invention has merits which meets the requirement for a patent. The above description should be considered as only the discussion of the preferred embodiments of the present invention. However, a person skilled in the art may make various modifications to the present invention. Those modifications still fall within the spirit and scope defined by the appended claims.

What is claimed is:

1. A wearable healthcare watch, comprising:
   a watch body having a watchband component wearable for a care receiver;
   an operation means, disposed in the watch body, functioning as an operation interface to generate an operation information;
   a sensing means, disposed in the watch body, including a physiology sensing unit and an environment sensing unit to obtain at least one sensing information;
   a positioning means, disposed in the watch body, for obtaining a position information of the watch body;
   a Bluetooth communication means, disposed in the watch body, being connected to a healthcare measurement apparatus in wireless manner to obtain at least one measurement data from the healthcare measurement apparatus;
   a help calling means, disposed in the watch body, for generating a help calling information by triggering;
   a warning means, disposed in watch body;
   a wireless communication means, disposed in the watch body, being wirelessly communicated to a communication device;
   a wireless transmission means, disposed in the watch body, being wirelessly transmitted to a remote server by means of a wireless transport service; and
   an information processing means, disposed in the watch body, being connected with the operation means, the positioning means, the Bluetooth communication means, the help calling means, the warning means, the wireless communication means, and the wireless transmission means,
   wherein a collecting information including the operation information, the sensing information, the position information, the measurement data and the help calling information is transmitted from the wearable healthcare watch to a remote server via the wireless transmission means, and right after the collecting information is received, the remote server automatically responds to the wearable healthcare watch by generating healthcare information based on the received collecting information and transmitting the generated healthcare information to the wearable healthcare watch via the wireless transmission means, and the warning means reminds the care receiver and reports the healthcare information to the care receiver such that the healthcare information is provided to the care receiver by the wearable healthcare watch.

2. The wearable healthcare watch as claimed in claim 1, wherein the physiology sensing unit includes a body surface temperature sensor.

3. The wearable healthcare watch as claimed in claim 1, wherein the environment sensing unit includes one or more sensors selected from the group including a altitude sensor, a gravity sensor, a displacement sensor, and a barometric pressure sensor.

4. The wearable healthcare watch as claimed in claim 1, wherein the positioning means includes one or two units selected from the group including a GPS positioning unit and a base station positioning unit.

5. The wearable healthcare watch as claimed in claim 1, wherein the wireless communication means includes a sound receiving unit and a speaker unit.

* * * * *